United States Patent [19]

Hara et al.

[11] Patent Number: 5,489,622

[45] Date of Patent: Feb. 6, 1996

[54] MOISTURE- OR ANAEROBIC-CURABLE AND PHOTOCURABLE SILICONE COMPOSITIONS

[75] Inventors: Osamu Hara, Kanagawa; Yasuo Hanazuka, Hachioji; Kunihiko Nakajima, Machida; Kohichi Naruse, Hachioji, all of Japan

[73] Assignee: Three Bond Co., Ltd., Tokyo, Japan

[21] Appl. No.: 249,812

[22] Filed: May 26, 1994

[30] Foreign Application Priority Data

Jun. 11, 1993 [JP] Japan ................................ 5-177164
Jul. 20, 1993 [JP] Japan ................................ 5-199914

[51] Int. Cl.$^6$ ................ C08G 18/61; C08L 75/16; C08L 83/06; C08L 83/07
[52] U.S. Cl. ............... 522/99; 522/172; 522/13; 522/14; 522/20; 528/25; 528/38; 528/32
[58] Field of Search .................. 522/99, 13, 20, 522/24, 29, 174, 14, 172, 99; 528/25, 38, 32

[56] References Cited

U.S. PATENT DOCUMENTS

| | | | |
|---|---|---|---|
| 4,035,355 | 7/1977 | Baney et al. | 260/46.5 Y |
| 4,293,397 | 10/1981 | Sato et al. | 204/159.13 |
| 4,496,210 | 1/1985 | Ansel et al. | 528/32 |
| 4,563,639 | 1/1986 | Gornowicz et al. | 556/421 |
| 4,849,461 | 7/1989 | Lee et al. | 522/99 |
| 5,264,278 | 11/1993 | Mazurek et al. | 525/477 |
| 5,378,734 | 1/1995 | Inoue | 522/11 |
| 5,384,340 | 1/1995 | Hara et al. | 522/170 |

FOREIGN PATENT DOCUMENTS 0467160 1/1992 European Pat. Off. .
4-268315 2/1991 Japan .

*Primary Examiner*—Susan W. Berman
*Attorney, Agent, or Firm*—Scully, Scott, Murphy & Presser

[57] ABSTRACT

A curable silicone composition comprising an addition reaction product of an organopolysiloxane having amino groups at both ends of its molecule and a vinyl group-containing isocyanate, and a moisture-curing or anaerobic-curing catalyst and a photopolymerization catalyst.

The silicone composition has high photocurability and moisture- or anaerobic-curability, easy to manufacture and easy to handle.

2 Claims, No Drawings

MOISTURE- OR ANAEROBIC-CURABLE AND PHOTOCURABLE SILICONE COMPOSITIONS

BACKGROUND OF THE INVENTION

The present invention relates to a silicone composition which can be cured by both curing mechanisms of a moisture- or anaerobic-curing mechanism and a photocuring mechanism.

Silicone affords a soft cured material rich in elasticity and having high impact resistance, vibration resistance and thermal stress resistance, and thus it is a substance of high industrial utility value. However, the conventional one-pack type silicone requires a considerable time for complete curing because it undergoes a condensation reaction in the presence of moisture and cures. To avoid this inconvenience, a silicone which cures upon exposure to light has recently been developed. For example, a silanol terminated organopolysiloxane is treated with an aminoalkoxysilane to replace the end with amino group, and glycidyl (meth)acrylate is added thereto to render the siloxane photocurable (see JP55-112262A). However, since the glycidyl group and the amino group are less reactive with each other, it is necessary to conduct the reaction at a high temperature under heating for a long time or use a catalysts. As to the addition reaction of glycidyl (meth)acrylate, since the epoxy group and the acryl group are similar in reactivity to each other, the acryl group will undergo Michael addition reaction, resulting in photocurability being sometimes not imparted to the siloxane.

In JP61-t145227A, a silicone oil of amino chain and a vinyl group-containing isocyanate are reacted with each other, but the cured material obtained is very hard because of a side chain type and thus is unsuitable for potting or bonding although it is superior for coating or the like.

Further, in the reaction of a vinyl group-containing isocyanate with an amino group terminated silicone oil, if the amino group is a primary amino group, urea bond results, so that the proportion of hydrogen bond increases and the viscosity becomes very high, thus making it very difficult to handle the reaction product.

An anaerobic-curable silicone is also known. Generally, while in contact with air or oxygen, this silicone does not cure and is stable over a long period of time, but when air or oxygen is shut off, for example, between two adjacent faces, it polymerizes and cures, so is used for bonding, sealing or fixing metallic parts and the like.

Heretofore, as anaerobic-curable compositions of this sort, there have been known compositions each comprising a monomer consisting principally of an acrylic ester monomer and/or a methacrylic ester monomer and an organic peroxide as a polymerization initiator. In such uses as bonding, sealing and fixing, however, this kind of anaerobic-curable composition has a drawback such that when placed at a high temperature after anaerobic polymerization and curing, the bonding force of the cured materials is deteriorated rapidly.

In JP53-142493A, JP4-213363A and JP268315A there are proposed anaerobic-curable polyorganosiloxane compositions, but since the (meth)acryl group contained therein is a side chain type, the cured materials obtained from them are very hard and inferior in impact resistance, not being rich in rubbery elasticity.

It is the object of the present invention to overcome the above-mentioned drawbacks of the prior art and provide a silicone composition having high photocurability and moisture- or anaerobic-curability, easy to manufacture and easy to handle.

SUMMARY OF THE INVENTION

The present invention relates to a moisture- or anaerobic-curable and photocurable silicone composition comprising (a) reaction product of an organopolysiloxane having amino groups at both ends of its molecule and a vinyl group-containing isocyanate, (b) a photopolymerization catalyst and (c) a moisture-curing catalyst or an anaerobic-curing catalyst.

The organopolysiloxane preferably has the following general formula:

$$HN(C_2H_4N)_l R^1 - \underset{\underset{X_{2-a}}{|}}{\overset{\overset{R^3}{|}}{\underset{|}{Si}}} - O(\underset{\underset{R^2}{|}}{\overset{\overset{R_a^2}{|}}{\underset{|}{Si}}} - O)_m \underset{\underset{X_{2-a}}{|}}{\overset{\overset{R_a^2}{|}}{\underset{|}{Si}}} - R^1(N-C_2H_4)_l NH$$

where $R^1$ is a divalent hydrocarbon group, $R^2$ and $R^3$ are each a monovalent hydrocarbon group, X is a hydroxyl group of a hydrolyzable group, l is an integer of 0 to 4, m is an integer of 1 to 10,000, and a is 0 or 1.

DETAILED DESCRIPTION OF THE INVENTION

The following description is now provided about the ingredients of the silicone composition according to the present invention.

The organopolysiloxane having amino groups at both ends of its molecule is represented by the foregoing general formula. As examples of the divalent hydrocarbon group represented by $R^1$ in the same formula there are mentioned alkylene groups preferably having 1 to 6 carbon atoms) such as methylene, ethylene and propylene, and arylene groups (preferably having 6 to 15 carbon atoms) such as phenylene. As examples of the monovalent hydrocarbon group represented by each of $R^2$ and $R^3$ there are mentioned alkyl groups (preferably having 1 to 6 carbon atoms) such as vinyl and allyl, benzyl, substituted alkyl groups (e.g.

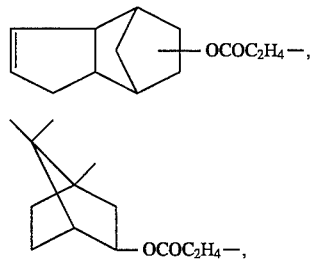

$(CH_3O)_3Si-C_3H_6-$, as well as those obtained by partial substitution of hydrogen atoms in the groups just mentioned with halogen atoms for example. Further, as examples of the hydrolyzable group represented by X there are mentioned alkoxy groups (preferably having 1 to 6 carbon atoms) such as methoxy, ethoxy and propoxy, oxime, amino, propenoxy and acetoxy.

Such organopolysiloxane can be prepared by a conventional method, for example by reacting a diorganopolysiloxane represented by the following formula and blocked with hydroxyl groups at both ends of its molecular chain;

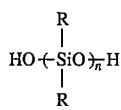

where R has the same meaning as that of $R^2$ defined above and n represents the same positive integer as that of m defined above, with a reactive silane compound having two or three hydrolyzable groups in one molecule and also having a secondary amino group as another reactive group. The use of such a secondary amino group is effective in decreasing the proportion of hydrogen bond between molecules an hence lowering the viscosity as compared with the use of a primary amino group.

As examples of the reactive silane compound used in the above reactions there are mentioned silane compounds of primary amines such as 3-aminopropyltrimethoxysilane and 3-aminopropyltriethoxysilane, silane compounds of secondary amines such as N-methylaminopropyltrimethoxysilane and N-benzylaminopropyltrimethoxysilane, secondary aminosilane compounds obtained by Michael addition reaction of silane compounds of primary amines [e.g. 3-aminopropyltrimethoxysilane, (β-aminoethyl)-γ-aminopropyltrialkoxysilane, (γ-aminopropyl)-β-aminoethyltrialkoxysilane, (γ-aminopropyl)-γ-aminopropyltrialkoxysilane, aminopropyltrialkoxysilane, aminopropylmethyldialkoxysilane], with various acrylate monomers, and compounds represented by the following general formula:

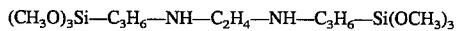

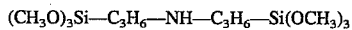

The vinyl group-containing isocyanate used in the present invention is a compound having in one molecule at least one vinyl group which is radical-polymerizable and an isocyanate group as a functional group for the reaction with amino group.

Examples are metharyloyl isocyanate, 2-isocyanatoethyl methacrylate, isopropenyl-2,2-dimethylbenzyl isocyanate, as well as isocyanate group-containing (meth)acrylates obtained by reacting compounds having two or more isocyanate groups such as 2,4-tolylene diisocyanate, 2,6-tolylene diisocyanate and 1,5-naphthalene diisocyanate with hydroxyl group-containing (meth)acrylates such as 2-hydroxyethyl methacrylate and 2-hydroxypropyl methacrylate.

The above reaction is usually performed in such a quantitative relation as permits thorough reaction of the isocyanate group of the vinyl group-containing isocyanate with the amino group of the amino group-containing organopolysiloxane. Usually, the latter is added in an amount of two mols or more per mol of the former, and the reaction is conducted in a somewhat heated state at 50° C. or so.

As the moisture-curing catalyst or anaerobic-curing catalyst and the photopolymerization catalyst to be added to 100 parts by weight of the resulting addition reaction product there may be used known ones.

As examples of the moisture-curing catalyst there are mentioned metallic salts of organocarboxylic acids such as lead-2-ethyl octoate, dibutyltin diacetate, dibutyltin dimethoxide, dibutyltin dilaurate, butyltin tri-2-ethyl hexoate, iron-2-ethyl hexoate, cobalt-2-ethyl hexoate, manganese-2-ethyl hexoate, zinc-2-ethyl hexoate, stannous caprylate, tin naphthenate, tin oleate, tin butylate, zinc naphthenate, cobalt naphthenate and zinc stearate; organotitanates such as tetrabutyl titanate, tetra-2-ethylhexyl titanate, triethanolamine titanate and tetra(isopropenyloxy)titanate; organotitanium compounds such as organosiloxytitanium and β-carbonyltitanium; alkoxyaluminum compounds; quaternary ammonium salts such as benzyltriethylammonium acetate; lower fatty acids of alkali metals such as potassium acetate, sodium acetate and lithium oxalate; and dialkylhydroxylamines such as dimethylhydroxyamine and diethylhydroxyamine. The amount of the moisture-curing catalyst is in the range of 0.01 to 10 parts by weight, preferably 0.1 to 5 parts by weight, based on the total weight of oligomer.

As the anaerobic-curing catalyst there is used an organic peroxide or an anaerobicization accelerator.

As examples of the organic peroxide there are mentioned hydroperoxides such as cumene hydroperoxide, t-butyl hydroperoxide and diisopropylbenzene hydroperoxide, as well as diacyl peroxides, dialkyl peroxides, ketone peroxides and peroxy esters. Particularly, cumene hydroperoxide is preferred because it is highly stable and is quick in exhibiting its bonding force.

As examples of the curing accelerator there are mentioned organosulfonimides, amines and organometallic salts.

As organosulfonimides, o-benzoic sulfonimides are preferred. Preferred as amines are diethylamine, triethylamine, triethylenediamine, N,N-dimethyl-p-toluidine and 1,2,3,4-tetrahydroquinoline. Examples organometallic salts include copper chloride and copper octylate.

The moisture-curing catalyst and the anaerobic-curing catalyst may be used in combination.

The amount of the anaerobic-curing catalyst is in the range of 0.01 to 10, preferably 0.10 to 5, parts by weight relative to 0.01 part by weight as the total amount of oligomer.

As examples of the photopolymerization catalyst there are mentioned acetophenone, propiophenone, benzophenone, xanthol, fluorein, benzaldehyde, anthraquinone, camphorquinone, triphenylamine, carbazole, 3-methylacetophenone, 4-methylacetophenone, 3-pentylacetophenone, 4-methoxyacetophenone, 3-bromoacetophenone, p-diacetylbenzene, 3-methoxybenzophenone, 4-allylacetophenone, 4-methylbenzophenone, 4-chloro-4-benzylbenzophenone, 3-chloroxanthone, 3,9-dichloroxanthone, 3-chloro-8-nonylxanthone, benzoyl, benzoin methyl ether, benzoin butyl ether, bis(4-dimethylaminophenyl)ketone, benzyl methoxy ketal, 2-chlorothioxanthone and 2,4,6-trimethylbenzoyldiphenylphosphine oxide.

As to the amount of the photopolymerization catalyst to be used, since it suffices to render the polymerization system slightly sensitive to light, the said amount may be selected in the range of 0.01 to 10, preferably 0.1 to 5, parts by weight based on 100 parts by weight as the total amount of oligomer present in the composition.

Although the composition of the present invention basically comprises the ingredients described above, there may be used various additives as necessary.

For the purpose of improving the shelf stability there may be used a free radical inhibitor such as benzoquinone or hydroquinone, as well as various fillers to improve the resin strength of cured material. Particularly, the use of fumed Silica is preferred for improving the physical properties of cured material.

As a radical polymerization initiator, not only a photopolymerization initiator but also a thermal polymerization initiator or a redox polymerization initiator may be used, thereby permitting thermal polymerization or redox polymerization to take place.

The curing composition of the present invention may be prepared as a binary composition using, for example, a composition of a polymerization initiator as a first component and others as a second component. In this case, both components are each applied to the surface to be bonded.

In the case of applying the composition of the present invention to an inert surface or to between two surfaces with a fairly wide gap present therebetween, it is desirable to use a suitable curing accelerator.

Further, for the adjustment of viscosity, there may be used, for example, dimethyl silicone oil or a reactive diluent. As a reactive diluent there may be used, for example, a compound having an unsaturated (vinyl double bond) group or a compound containing a hydrolyzable group. More concrete examples are (meth)acrylic esters such as isobornyl acrylate, isobornyl methacrylate, dicyclopentenyl acrylate and phenoxyethyl acrylate, compounds containing unsaturated groups or hydrolyzable groups such as 3-(meth)acryloylpropyltrimethoxysilane, 3-(meth)acryloylpropyldimethoxymethylsilane, vinyltrimethoxysilane,

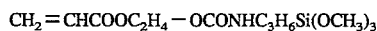

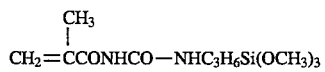

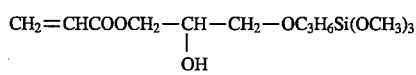

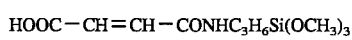

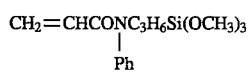

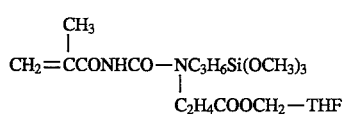

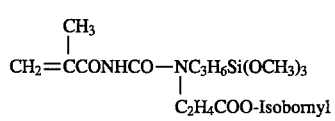

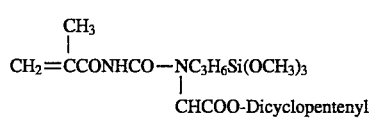

and silane coupling agents such as

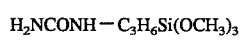

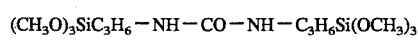

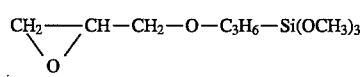

The anaerobic-curable and photocurable silicone composition cures anaerobically in the interior of a bonded surface wherein it is not in contact with air, while at a protruded portion or the like in contact with air it cures upon exposure to light. Because of these characteristics it is extremely useful for bonding, fixing or sealing screws, bolts, flange faces, etc.

The present invention will be described below by way of working examples thereof.

PRODUCTION EXAMPLE 1

27g of N-benzylaminopropyltrimethoxysilane was added to 1,000 g of silanol-terminated polydimethylsiloxane (molecular weight: 30,000) and reaction was allowed to take place at 100° C. for 2 hours with stirring under nitrogen purge, followed by evacuation to remove surplus N-benzylaminopropyltrimethoxysilane, affording N-benzylamino terminated polydimethylsiloxane having a viscosity of 8,000 cPs.

PRODUCTION EXAMPLE 2

27 g of N-benzylaminopropyltrimethoxysilane was added to 1,000 g of silanol-terminated polydimethylsiloxane (molecular weight: 20,000) and reaction was allowed to take place at 100° C. for 2 hours with stirring under nitrogen purge, followed by evacuation to remove excess N-benzylaminopropyltrimethoxysilane, affording N-benzylamino terminated polydimethylsiloxane having a viscosity of 1,000 cPs.

EXAMPLE 1

1.1 g of 2-isocyanatoethyl methacrylate was added to 100 g of the resin prepared in Production Example 1 and reaction was allowed to take place at 50° C. for 1 hour with stirring under nitrogen purge. Further added were 1 g of 1-hydroxycyclohexyl phenyl ketone as a photocuring catalyst and 0.5 g of dibutyltine dilaurate as a moisture-curing catalyst to afford a moisture- and ultraviolet-curable silicone composition having a viscosity of 15,000 cPs.

EXAMPLE 2

1.6 g of 2-isocyanatoethyl methacrylate was added to 100 g of the resin prepared in Production Example 2 and reaction was allowed to take place at room temperature for 1 hour with stirring under nitrogen purge. Further added were 1 g of dimethoxyacetophenone as a photocuring catalyst and 0.5 g of dibutyltine dilaurate as a moisture-curing catalyst to afford a moisture- and ultraviolet-curable silicone composition having a viscosity of 20,000 cPs.

COMPARATIVE EXAMPLE 1

An amino-terminated polydimethylsiloxane having a viscosity of 20,000 cPs was prepared in the same way as in Production Example 1 except that 3-aminopropyltrimethoxysilane was substituted for N-benzylaminopropyltrimethoxysilane. Then, reaction was performed in the same manner as in Example 1. The viscosity of the resulting composition was 45,000 cPs.

COMPARATIVE EXAMPLE 2

An amino-terminated polydimethylsiloxane having a viscosity of 10,000 cPs was prepared in the same way as in Production Example 2 except that 3-aminopropyltrimethoxysilane was substituted for N-benzylaminopropyltrimethoxysilane. Then, reaction was performed in the same manner as in Example 2. The viscosity of the resulting composition was 20,000 cPs.

PRODUCTION EXAMPLE 3

38.7 g of an equimolar adduct of 3-aminopropyltrimethoxysilane and isobornyl acrylate was added to 1,000 g of silanol-terminated polydimethylsiloxane (molecular weight: 20,000) and reaction was allowed to take place at 100° C. for 2 hours with stirring under nitrogen purge, followed by evacuation to remove methanol as by-product, thereby affording an amino-terminated polydimethylsiloxane having a viscosity of 900 cPs.

EXAMPLE 3

1.6 g of 2-isocyanatoethyl methacrylate was added to 100 g of the resin prepared in Production Example 3 and reaction was allowed to take place at room temperature for 1 hour with stirring under nitrogen purge. Further added were 1 g of 1-hydroxycyclohexyl phenyl ketone as a photocuring catalyst and 0.5 g of dibutyltine dilaurate as a moisture-curing catalyst to afford a moisture- and ultraviolet-curable silicone composition having a viscosity of 12,000 cps.

The resin compositions obtained in the above examples were each charged into a container of 5 mm in depth ×150 mm×150 mm and then irradiated under the conditions of 150 mW/cm$^2$ ×20 seconds, using a 4 KW high-pressure mercury vapor lamp. As a result, curing occurred. The cured material was measured for hardness (JIS hardness A type), tensile strength and elongation. When a moisture-cured material not irradiated with ultraviolet light was allowed to stand in an atmosphere of 25° C., 60% humidity, the surface thereof cured into a tack-free state in 24 hours. Hardness (JIS hardness A), tensile strength and elongation were measured after 7 days.

TABLE 1

|  | Example | | | Comparative Example | |
|---|---|---|---|---|---|
|  | 1 | 2 | 3 | 1 | 2 |
| Ultraviolet-cured Product | | | | | |
| Hardness (JIS-A) | 40 | 60 | 60 | 40 | 55 |
| Tensile Strength (Kgf/cm$^2$) | 4.5 | 2.5 | 2.7 | 4.2 | 2.3 |
| Elongation (%) | 130 | 60 | 50 | 140 | 65 |
| Moisture-cured Product | | | | | |
| Tack-Free (hr) | 20 | 20 | 20 | 23 | 23 |
| Hardness (JIS-A) | 32 | 55 | 55 | 35 | 50 |
| Tensile Strength (Kgf/cm$^2$) | 5.6 | 3.0 | 2.5 | 5.0 | 3.0 |
| Elongation (%) | 170 | 70 | 60 | 160 | 70 |
| Viscosity of Composition (cps) | 15000 | 2000 | 1800 | 45000 | 20000 |

PRODUCTION EXAMPLE 4

20 g of 3-aminopropyltrimethoxysilane was added to 1,000 g of silanol-terminated polydimethylsiloxane (molecular weight: 30,000) and reaction was allowed to take place at 100° C. for 2 hours with stirring under nitrogen purge, followed by evacuation to remove both excess 3-aminopropyltrimethoxysilane and methanol which was distilled off, thereby affording an amino-terminated Polydimethylsiloxane.

PRODUCTION EXAMPLE 5

30 g of N-benzylaminopropyltrimethoxysilane was added to 1,000 g of silanol-terminated polydimethylsiloxane (molecular weight:20,000) and reaction was allowed to take place at 100° C. for 2 hours with stirring under nitrogen purge, followed by evacuation to remove both excess N-benzylaminopropyltrimethoxysilane, and methanol which was distilled off, thereby affording amino-terminated polydimethylsiloxane.

PRODUCTION EXAMPLE 6

38.7 g of an equimolar adduct of 3-aminopropyltrimethoxysilane and isobornyl acrylate was added to 1,000 g of silanol-terminated polydimethylsiloxane (molecular weight: 20,000) and reaction was allowed to take place at 100° C. for 2 hours with stirring under nitrogen purge, followed by evacuation to remove excess methanol as by-product, thereby affording amino-terminated polydimethylsiloxane.

EXAMPLE 4

1.1 g of 2-isocyanatoethyl methacrylate was added to 100 g of the resin prepared in Production Example 4 and reaction was allowed to take place at 50° C. for 1 hour with stirring under nitrogen purge. Further added were 1 g of 1-hydroxycyclohexyl phenyl ketone as a photocuring catalyst, as well as, as an anaerobic-curing catalyst, 0.5 g of cumene hydroperoxide, 1 g of o-benzoic sulfimide and 0.5 of N,N-dimethyl-p-toluidine. As a result, there was obtained an anaerobic-curable and photocurable silicone composition.

EXAMPLE 5

1.6 g of 2-isocyanatoethyl methacrylate was added to 100 g of the resin prepared in Production Example 5 and reaction was allowed to take place at room temperature for 1 hour with stirring under nitrogen purge. Further added were 1 g of dimethoxyacetophenone as a photocuring catalyst, as well as, as an anaerobic-curing catalyst, 0.5 g of cumene hydroperoxide, 1 g of o-benzoic sulfimide and 0.5 of N,N-dimethyl-p-toluidine. As a result, there was obtained an anaerobic-curable and photocurable silicone composition.

EXAMPLE 6

1.6 g of 2-isocyanatoethyl methacrylate was added to 100 g of the resin prepared in Production Example 6 and reaction was allowed to take place at room temperature for 1 hour with stirring under nitrogen purge. Further added were 1 g of 1-hydroxycyclohexyl phenyl ketone as a photocuring catalyst, as well as, as an anaerobic-curing catalyst, 0.5g of cumene hydroperoxide, 1 g of o-benzoic sulfimide and 0.5 of N,N-dimethyl-p-toluidine. As a result, there was obtained an anaerobic-curable and photocurable silicone composition.

COMPARATIVE EXAMPLE 3

The procedure of Example 4 was repeated except that the cumene hydroperoxide, o-benzoic sulfimide and N,N-dimethyl-p-toluidine, which were used as an anaerobic-curing catalyst in Example 4, were not used.

COMPARATIVE EXAMPLE 4

The procedure of Example 5 was repeated except that the dimethoxyacetophenone used as a photocuring catalyst in Example 5, was not used.

The resin compositions obtained in the above examples were each charged into a container of 5 mm in depth ×150 mm×150 mm and irradiated under the conditions of 150 mW/cm$^2$ ×20 seconds, using a 4 KW high-pressure mercury vapor lamp. As a result, curing occurred. The cured material was measured for hardness (JIS hardness A type), tensile strength, elongation and tensile bond strength.

For measuring characteristics of each anaerobic-curing composition there was used a test piece for fitting (soft steel pin, 6ø×40 mm, collar inside dia. 6ø×15 mm, clearance 1/100 mm).

For measurement of fixing time and compressive shear strength there was used a defatted test piece for fitting with a 1% copper octylate solution in acetone applied thereto as a curing accelerator. As the fixing time there was measured the time required after application of an anaerobic-curable composition to the test piece, followed by standing at 25° C., until when the shaft was no longer moved easily by hand. As to the compressive shear strength, it was measured at a compressing speed of 10 mm/min after 24 hours at 25° C. These results are shown in Table 2 below.

TABLE 2

| Physical Properties | Example | | | Comparative Example | |
|---|---|---|---|---|---|
| | 1 | 2 | 3 | 1 | 2 |
| Photocuring Properties | | | | | |
| Hardness (JIS-A) | 40 | 60 | 60 | 40 | not cured |
| Tensile Strength (Kgf/cm$^2$) | 4.5 | 2.5 | 2.7 | 4.2 | not cured |
| Elongation (%) | 130 | 60 | 50 | 140 | not cured |
| Tensil Shear Bond Strength Acryl/Fe (Kgf/cm$^2$) | 10 | 15 | 13 | 9 | not cured |
| Anaerobic-curing Properties | | | | | |
| Fixing Time (min) | 10 | 6 | 8 | not fixed | 8 |
| Compressive Shear Strength (Kgf/cm$^2$) | 32 | 55 | 55 | not cured | 50 |

PRODUCTION EXAMPLE 7

29 g of an equimolar adduct of (β-aminomethyl)-γ-aminopropyltrimethoxysilane and isobornyl acrylate was added to 1,000 g of silanol-terminated polydimethylsiloxane (molecular weight:3,000) and reaction was allowed to take place at 100° C. for 2 hours with stirring under nitrogen purge, followed by evacuation to remove excess methanol, thereby affording amino-terminated polydimethylsiloxane having a viscosity of 7,500 cPs.

PRODUCTION EXAMPLE 8

26 g of an equimolar adduct of γ-aminopropyltrimethoxysilane and dicyclopentadienyl acrylate was added to 1,000 g of silanol-terminated polydimethylsiloxane (molecular weight: 3,000) and reaction was allowed to take place at 100° C. for 2 hours with stirring under nitrogen purge, followed by evacuation to remove excess methanol, thereby affording amino-terminated polydimethylsiloxane having a viscosity of 7,000 cPs.

EXAMPLE 7

2.0 g of 2-isocyanatoethyl methacrylate was added to 100 g of the resin prepared in Production Example 7 and reaction was allowed to take place at room temperature for 1 hour with stirring under nitrogen purge. Further added were 1 g of diethoxyacetophenpne as a photocuring catalyst and 11.0 g of tetraisopropoxytitanium as a moisture-curing catalyst to afford a moisture- and ultraviolet-curable silicone composition.

EXAMPLE 8

1.0 g of 2-isocyanatoethyl methacrylate was added to 100 g of the resin prepared in Production Example 8 and reaction was allowed to take place at room temperature for 1 hour with stirring under nitrogen purge. Further added were 1 g of 1-hydroxycyclohexyl phenyl ketone as a photocuring catalyst and 0.5 g of dibutyltine dioctate as a moisture-curing catalyst to afford a moisture- and ultraviolet-curable silicone composition.

TABLE 3

| Physical Properties | Example 6 | Example 7 |
|---|---|---|
| Ultraviolet-cured Product | | |
| Hardness (JIS-A) | 45 | 35 |
| Tensile Strength (Kgf/cm$^2$) | 5.0 | 4.0 |
| Elongation (%) | 150 | 120 |
| Moisture-cured Product | | |
| Tack-Free (hr) | 5 | 20 |
| Hardness (JIS-A) | 35 | 30 |
| Tensile Strength (Kgf/cm$^2$) | 5.5 | 4.5 |
| Elongation (%) | 180 | 200 |
| Viscosity of Composition (cps) | 18,000 | 12,000 |

What is claimed is:

1. A curable silicone composition comprising a reaction product of an organopolysiloxane represented by the general formula:

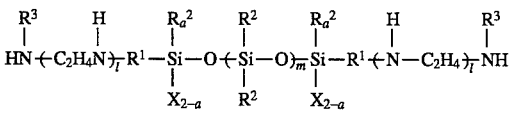

where $R^1$ is alkylene having 1 to 6 carbon atoms; $R^2$ is alkyl, vinyl, allyl, benzyl or alkyl substituted with halogen; $R^3$ is alkyl, vinyl, allyl, benzyl,

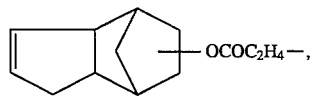

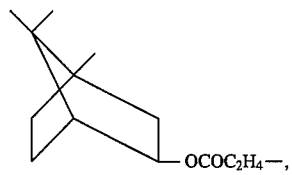

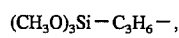

or any of the above substituted with halogen; X is hydroxyl or a hydrolyzable group; l is zero or 1; m is an integer of 10 to 10,000; and a is zero to 2, and a vinyl group-containing isocyanate; a moisture-curing or an anaerobic-curing catalyst and a photopolymerization catalyst.

2. A curable silicone composition as set forth in claim 1, wherein said moisture-curing catalyst or anaerobic-curing catalyst and said photopolymerization catalyst are used each in an amount of 0.01 to 10 parts by weight based on 100 parts by weight of said reaction product of said organopolysiloxane and vinyl group-containing isocyanate.

* * * * *

UNITED STATES PATENT AND TRADEMARK OFFICE
CERTIFICATE OF CORRECTION

PATENT NO. : 5,489,622
DATED : February 6, 1996
INVENTOR(S) : Osamu Hara, et al.

It is certified that error appears in the above-indentified patent and that said Letters Patent is hereby corrected as shown below:

On the Title Page, Section [56], under "U.S. PATENT DOCUMENTS": "4,563,639" should read --4,563,539

Column 1, line 31: "JP61-t145227A" should read --JP61-145227A--

Column 2, line 18: both instances of "$R_a^2$" should read --$R^2_a$--

Column 2, line 24: "1" should read -- --
Column 2, line 38: before "preferably" insert --(--
Column 3, line 14: "an" should read --and--
Column 3, line 17: "reactions" should read --reaction--
Column 3, line 39: "metharyloyl" should read --methacryloyl--

UNITED STATES PATENT AND TRADEMARK OFFICE
CERTIFICATE OF CORRECTION

PATENT NO. : 5,489,622
DATED : February 6, 1996
INVENTOR(S) : Osamu Hara, et al.

It is certified that error appears in the above-indentified patent and that said Letters Patent is hereby corrected as shown below:

Column 4, line 59: "Silica" should read --silica--
Column 7, line 15: "cps" should read --cPs--
Column 10, line 1: "diethoxyacetophenpne" should read --diethoxyacetophenone--
Column 10, line 33, Claim 1: "$R_a^2$" should read --$R^2_a$--
Column 10, line 57, Claim 1: "2," should read --2;--

Signed and Sealed this

Third Day of December, 1996

Attest:

BRUCE LEHMAN

Attesting Officer        Commissioner of Patents and Trademarks